T. W. BENOIST.
AEROPLANE.
APPLICATION FILED JULY 1, 1912.
1,066,981.
Patented July 8, 1913.
3 SHEETS—SHEET 2.
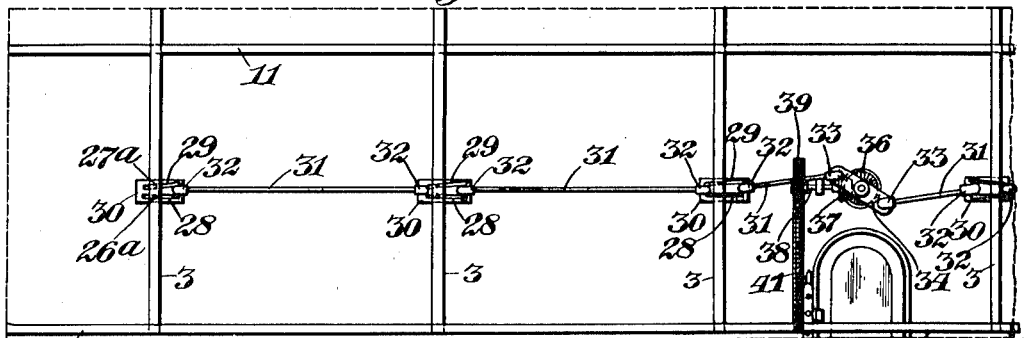
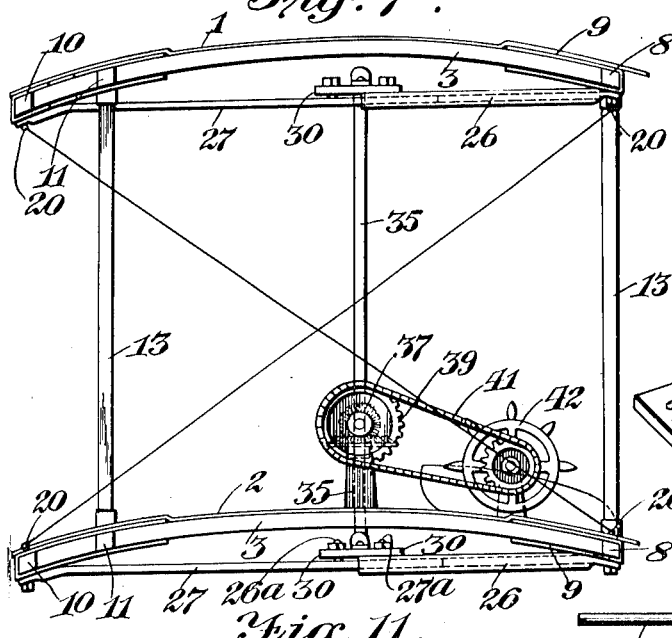
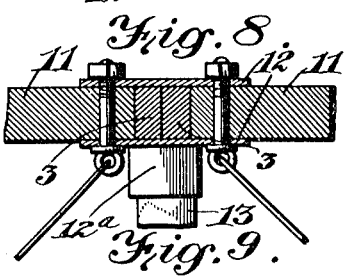
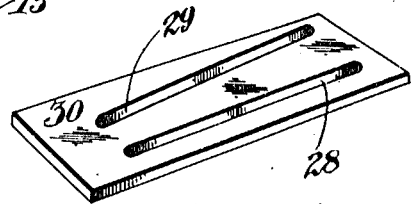
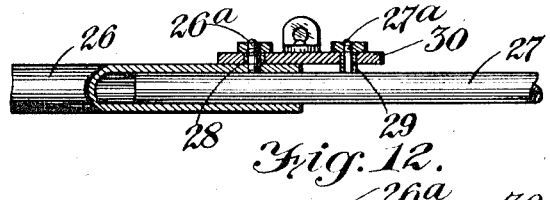
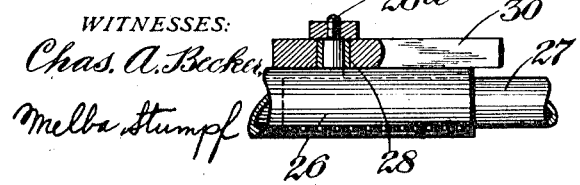
WITNESSES:
Chas. A. Becker
Melba Stumpf
INVENTOR.
Thomas W. Benoist
BY
Small & Small
ATTORNEYS.

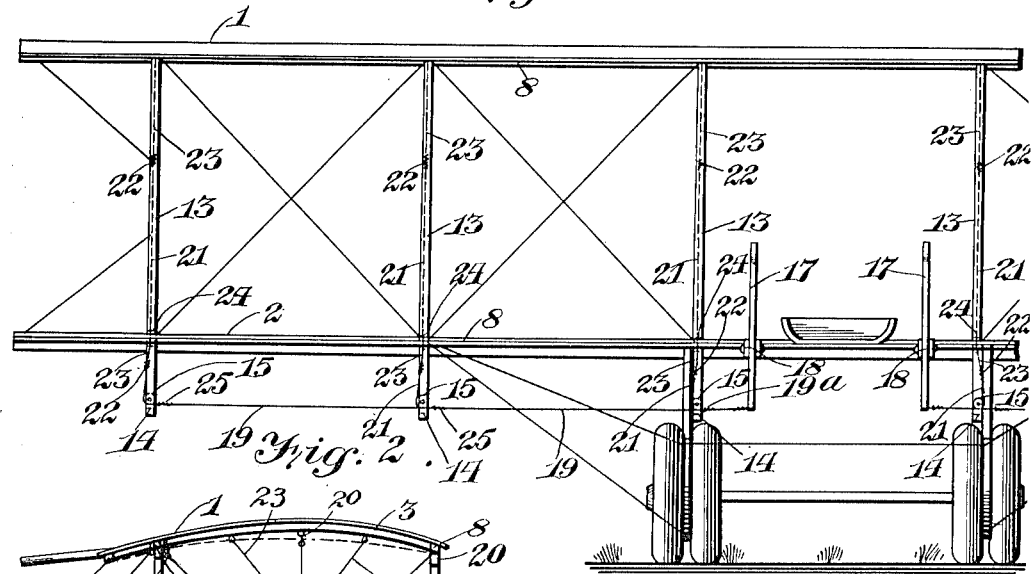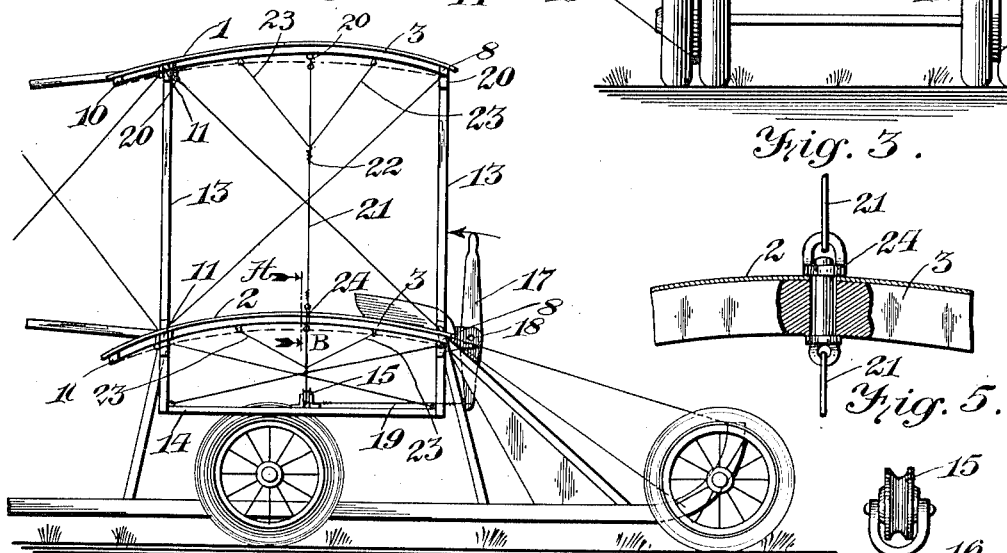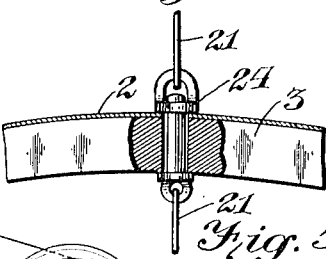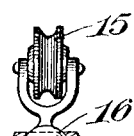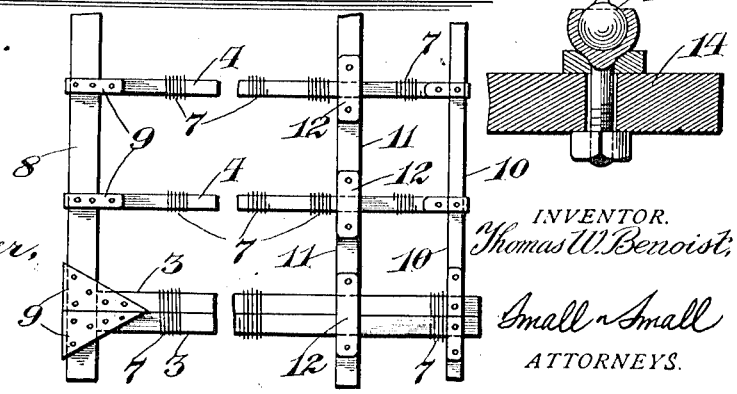

T. W. BENOIST.
AEROPLANE.
APPLICATION FILED JULY 1, 1912.
1,066,981.
Patented July 8, 1913.
3 SHEETS—SHEET 3.
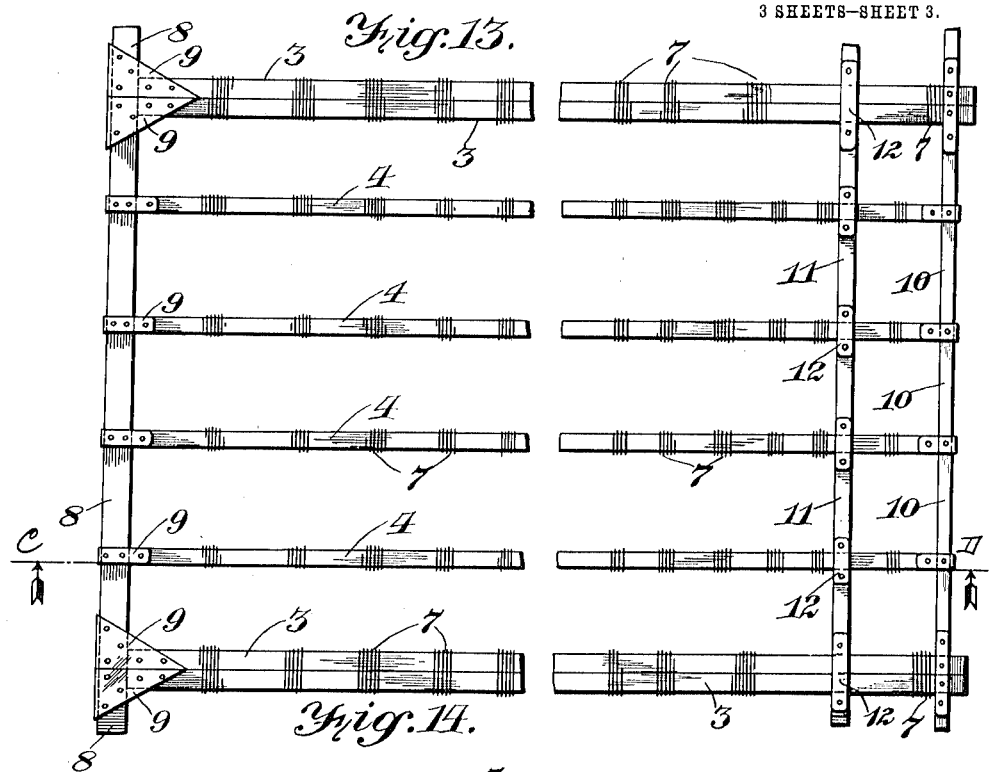
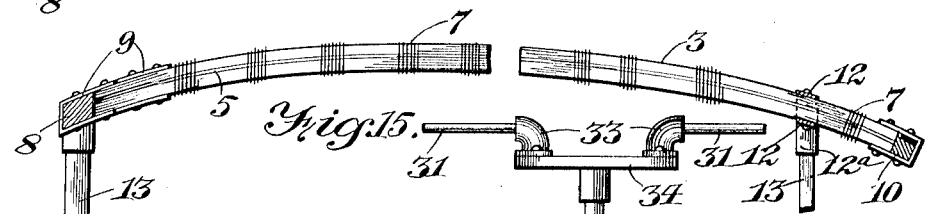
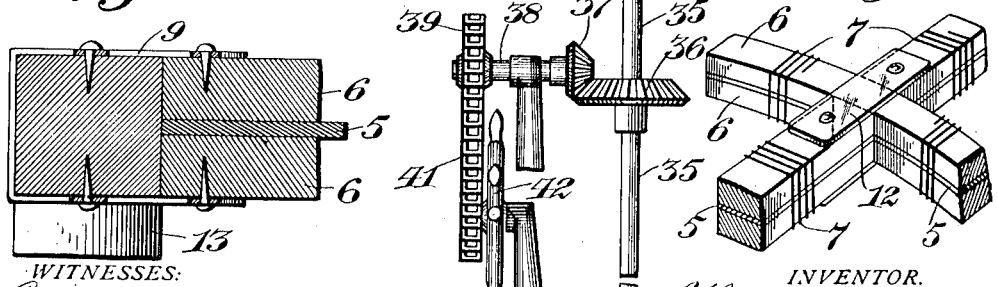
WITNESSES:
Chas. A. Becker
Melba Stumpf
INVENTOR.
Thomas W. Benoist,
BY Small & Small
ATTORNEYS.

UNITED STATES PATENT OFFICE.

THOMAS W. BENOIST, OF ST. LOUIS, MISSOURI.

AEROPLANE.

1,066,981. Specification of Letters Patent. Patented July 8, 1913.

Application filed July 1, 1912. Serial No. 707,001.

*To all whom it may concern:*

Be it known that I, THOMAS W. BENOIST, a citizen of the United States, residing at St. Louis, in the State of Missouri, have invented a new and useful Aeroplane, of which the following is a specification.

My invention relates to improvements in aeroplanes, and the prime object thereof is the provision of means whereby the camber or curve normally present in the planes or sustaining surfaces of such machines can be varied or substantially eliminated at the will of the operator, whereby the resistance of said surfaces while the machine is in flight may be reduced or increased and its lateral balance maintained or restored. This object may be attained through a variety of mechanical contrivances, and, hence, I do not propose to limit myself to specific claims, but for purposes of illustration I have shown in the drawings forming part of this application the two (2) types of mechanism which I prefer to employ for the purpose described.

Referring to said drawings, which are more or less diagrammatic in character, Figure 1 is a front elevation of a biplane embracing my invention; Fig. 2 is a side elevation of the machine of Fig. 1; Fig. 3 an enlarged view, partly in section, taken along line A—B of Fig. 2; Fig. 4 a top plan view depicting the construction and disposition of the ribs of the lifting planes; Fig. 5 a detail view of the form of sheave and socket which I prefer to employ for certain purposes; Fig. 6 a top plan view of a plane embracing my invention in a form different from that disclosed in Figs. 1 to 5; Fig. 7 a side elevation of the machine of Fig. 6; and Figs. 8 to 17 detail views, on enlarged scale, depicting the construction and arrangement of various important elements of my invention as hereinafter described, Fig. 14 being taken along line C—D of Fig. 13.

Like numerals refer to like parts throughout the several views.

In Figs. 1 to 5 of the accompanying drawing a biplane is illustrated whose planes 1 and 2 embrace a plurality of what shall be termed major ribs 3 and a plurality of minor ribs 4, all of said ribs being so constructed as to be resilient, strong and flexible. The preferable construction of these ribs, which forms a portion of the subject-matter of another of my applications for patent about to be filed, is shown in Fig. 17 and consists in interposing a thin strip of steel 5 between two strips of wood 6, these three members being riveted together at one extremity of the rib and rather loosely wrapped with wire at intervals throughout their length, as shown at 7. At the front edges of the planes said ribs are held in engagement with the horizontal beams 8 by any suitable contrivance, as, for example, the brace plates 9, while their rear extremities are secured to horizontally disposed beams 10 as best shown in Figs. 13 and 14. Normally arranged adjacent beam 10 is a sectional beam which is built up of a plurality of short struts 11 between each pair of which is projected a rib of the planes, the opposite ends of said struts being connected above and below by brace-plates 12, certain of which are formed integral with sleeves 12ª in which vertical struts 13 are seated. Thus a socket or seat is provided which permits of the extension of the ribs when their normal camber is temporarily removed, as hereinafter described and, moreover, this construction imparts greater stability to the ribs of the planes and renders the machine less liable to accident while in flight inasmuch as said ribs are thus engaged by horizontally extending members at three (3) different points of their length. To effect alterations in the camber of the ribs the vertical struts 13 are prolonged beneath the lowest of the planes and serve to support cross-struts 14 upon each of which is secured a revoluble sheave 15, the same preferably mounted in a ball-and-socket joint 16. At either side of the seat of the operator a lever 17 is arranged, the same being fulcrumed as at 18, and to the lower extremity of said lever a wire 19 is secured which is led over a sheave at point 19ª and thence carried under sheaves 15 to terminate adjacent the end of the machine. Cross-struts 14 are, preferably, disposed in substantially the same vertical plane as what have been termed major ribs 3, two (2) of the latter being brought together at the points of juncture of struts 13 with the planes, as shown in Fig. 8, and adjacent the opposite ends of each of said ribs and at their approximate center are inserted eyelets 20. To the center eyelet is secured a wire or cord 21 which is joined at 22 by laterals 23 which are engaged with the other of said eyelets, wire 21 being secured to an eyebolt 24 which is projected through each of the major ribs of the lower plane or planes, said wire being continued from the opposite end of said bolt and finally engaged with wire 19 as shown at 25.

The operation of the described mechanism is as follows: Upon movement of lever 17 by the operator, wire 19 will be so drawn as to effect a decided downward pull upon each of wires 21, said pull being simultaneously imparted to laterals 23, and thus, by reason of the fact that the rear extremities of both the minor and major ribs are secured to a common beam 10, the camber of all of said ribs is reduced or substantially eliminated according to the desire of the operator.

Referring to the devices shown in Figs. 6 to 16, a biplane is there shown whose ribs and other frame-members embody substantially the same features of construction as have been hereinbefore described. The mechanism here illustrated for effecting variations in the camber of the planes contemplates the use of a plurality of hollow tubes 26 which are affixed to the forward extremity of each of ribs 3, the opposite extremity of said ribs supporting rods 27 whose free ends are projected within said tubes. Said rods and tubes are each provided with pins 26ª, 27ª, pin 26ª projecting through a straight slot 28 and pin 27ª through an angular slot 29 provided in a board or light metal member 30. Each of said boards is connected with the other of its kind by means of rigid links 31, while at the center of the machine said links serve to connect revoluble sockets 32, 33. Sockets 33 are mounted upon a plate 34 which is carried upon either extremity of a shaft 35, said shaft being provided with a bevel gear 36 which meshes with a similar gear 37, the same carried by a shaft 38 connected with a sprocket-wheel 39. Said sprocket is connected with a like member 40 through the agency of a chain 41, sprocket 40 being adapted to move in response to the revolution of wheel 42 by the operator. The operation of this form of mechanism is readily comprehended. Upon revolution of wheel 42 sprocket 39 effects movement of gears 36, 37 which results in turning shaft 35 and plates 34. Upon the turning of said plates to the position shown in Fig. 6 those of links 31 which are connected therewith are pulled inwardly and this results in drawing members 30 toward the center of the machine. Upon the described movement of members 30 pins 27ª, following the direction of angular slots 29, act to force outwardly rods 27, said members being held in proper position during such action through the agency of pins 26ª engaged with straight slots 28, and, by reason of the fact that the rear extremities of both the minor and major ribs are secured to a common beam 10, said movement of said rods has the effect of reducing or substantially eliminating, according to the will of the operator, the camber of all of said ribs. Irrespective of which of the mechanisms is employed for the purpose described, it will be understood that upon release by the operator of lever 17 in the one case or wheel 42 in the other, the planes will automatically resume their normal curved formation by aid of the natural tendency of their ribs supplemented by the wind pressure.

While the foregoing portion of this specification sets forth the construction and operation of two forms of mechanism both of which attain the object hereinbefore described, yet I do not wish to be understood as confining myself thereto and the right is reserved of departing from the precise details of construction and arrangement of parts which have been described and illustrated without departing from the spirit of my invention and the scope of the following claims.

What I claim as new and desire to secure by Letters-Patent is—

1. A flying machine comprising sustaining surfaces, ribs supporting said surfaces, and a sectional beam disposed intermediate the opposite extremities of said ribs, said ribs adapted to move between the sections of said beam.

2. A flying machine comprising vertically disposed frame members, sustaining surfaces, ribs supporting said surfaces, and a sectional beam adapted to retain said ribs in slidable engagement with said members.

3. A flying machine comprising normally curved sustaining surfaces, ribs supporting said surfaces, a sectional beam disposed intermediate the opposite extremities of said ribs, and means for effecting variations in the curvature of said surfaces, said ribs adapted to move between the sections of said beam in response to the operation of said means.

4. A flying machine comprising normally curved sustaining surfaces, ribs supporting said surfaces, a sectional beam disposed intermediate the opposite extremities of said ribs, extensible members adapted to effect variations in the curvature of said surfaces, and means for extending and contracting said members, said ribs adapted to move between the sections of said beam in response to the operation of said means.

5. A flying machine comprising normally curved sustaining surfaces, ribs supporting said surfaces, a sectional beam disposed intermediate the opposite extremities of said ribs, extensible members adapted to effect variations in the curvature of said surfaces, and means for extending or contracting all of said members simultaneously, said ribs adapted to move between the sections of said beam in response to the operation of said means.

6. A flying machine comprising normally curved sustaining surfaces, ribs supporting said surfaces, a sectional beam disposed intermediate the opposite extremities of said ribs, extensible members adapted to effect variations in the curvature of said surfaces, and means, under control of the aviator, for extending and contracting said members, said ribs adapted to move between the sections of said beam in response to the operation of said means.

7. A flying machine comprising normally curved sustaining surfaces, ribs supporting said surfaces, a sectional beam disposed intermediate the opposite extremities of said ribs, extensible members adapted to effect variations in the curvature of said surfaces, and means, under control of the aviator, for extending or contracting all of said members simultaneously, said ribs adapted to move between the sections of said beam in response to the operation of said means.

8. A flying machine comprising normally curved sustaining surfaces, ribs supporting said surfaces, a sectional beam disposed intermediate the opposite extremities of said ribs, telescopic members adapted to effect variations in the curvature of said surfaces, and means for extending and contracting said members, said ribs adapted to move between the sections of said beam in response to the operation of said means.

9. A flying machine comprising normally curved sustaining surfaces, ribs supporting said surfaces, a sectional beam disposed intermediate the opposite extremities of said ribs, telescopic members adapted to effect variations in the curvature of said surfaces, and means for extending or contracting all of said members simultaneously, said ribs adapted to move between the sections of said beam in response to the operation of said means.

10. A flying machine comprising normally curved sustaining surfaces, ribs supporting said surfaces, a sectional beam disposed intermediate the opposite extremities of said ribs, telescopic members adapted to effect variations in the curvature of said surfaces, and means, under control of the aviator, for extending and contracting said members, said ribs adapted to move between the sections of said beam in response to the operation of said means.

11. A flying machine comprising normally curved sustaining surfaces, ribs supporting said surfaces, a sectional beam disposed intermediate the opposite extremities of said ribs, telescopic members adapted to effect variations in the curvature of said surfaces, and means, under control of the aviator, for extending or contracting all of said members simultaneously, said ribs adapted to move between the sections of said beam in response to the operation of said means.

12. A flying machine comprising normally curved sustaining surfaces, telescopic members connected therewith adapted to effect variations in the curvature thereof, and means for extending and contracting said members.

13. A flying machine comprising normally curved sustaining surfaces, telescopic members connected therewith adapted to effect variations in the curvature thereof, means for extending and contracting said members, and devices permitting movement of said surfaces in response to the operation of said members.

14. A flying machine comprising normally curved sustaining surfaces, telescopic members connected therewith adapted to effect variations in the curvature thereof, and means for extending or contracting all of said members simultaneously.

15. A flying machine comprising normally curved sustaining surfaces, telescopic members connected therewith adapted to effect variations in the curvature thereof, means for extending or contracting all of said members simultaneously, and devices permitting movement of said surfaces in response to the operation of said members.

16. A flying machine comprising normally curved sustaining surfaces, telescopic members connected therewith adapted to effect variations in the curvature thereof, and means, under control of the aviator, for extending and contracting said members.

17. A flying machine comprising normally curved sustaining surfaces, telescopic members connected therewith adapted to effect variations in the curvature thereof, means, under control of the aviator, for extending and contracting said members, and devices permitting movement of said surfaces in response to the operation of said members.

18. A flying machine comprising normally curved sustaining surfaces, telescopic members connected therewith adapted to effect variations in the curvature thereof, and means, under control of the aviator, for extending or contracting all of said members simultaneously.

19. A flying machine comprising normally curved sustaining surfaces, telescopic members connected therewith adapted to effect variations in the curvature thereof, means, under control of the aviator, for extending or contracting all of said members simultaneously, and devices permitting movement of said surfaces in response to the operation of said members.

THOMAS W. BENOIST.

Witnesses:
W. KEANE SMALL,
MELBA STUMPF.